United States Patent
Tang et al.

(10) Patent No.: US 12,049,720 B2
(45) Date of Patent: *Jul. 30, 2024

(54) METHOD AND SYSTEM FOR REDUCING AUTO-DOSING FLUCTUATION OF AN AUTOMATIC CLEANING MACHINE

(71) Applicant: The Procter & Gamble Company, Cincinnati, OH (US)

(72) Inventors: Ming Tang, Beijing (CN); Xiaolin Yang, Beijing (CN)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/138,981

(22) Filed: Apr. 25, 2023

(65) Prior Publication Data
US 2023/0265595 A1    Aug. 24, 2023

Related U.S. Application Data

(60) Continuation of application No. 17/735,412, filed on May 3, 2022, now Pat. No. 11,668,043, which is a continuation of application No. 16/952,890, filed on Nov. 19, 2020, now Pat. No. 11,352,733, which is a division of application No. 16/030,892, filed on Jul. 10, 2018, now Pat. No. 10,863,880.

(30) Foreign Application Priority Data

Jul. 27, 2017 (CN) .................. 2017094615

(51) Int. Cl.
| | |
|---|---|
| *D06F 39/02* | (2006.01) |
| *A47L 15/00* | (2006.01) |
| *C11D 1/37* | (2006.01) |
| *C11D 17/00* | (2006.01) |
| *G05D 11/00* | (2006.01) |
| *A47L 15/44* | (2006.01) |
| *C11D 1/22* | (2006.01) |
| *C11D 1/29* | (2006.01) |

(52) U.S. Cl.
CPC ........ *D06F 39/022* (2013.01); *A47L 15/0055* (2013.01); *C11D 1/37* (2013.01); *C11D 17/0008* (2013.01); *C11D 17/0026* (2013.01); *G05D 11/00* (2013.01); *A47L 15/4418* (2013.01); *C11D 1/22* (2013.01); *C11D 1/29* (2013.01)

(58) Field of Classification Search
CPC .................................... D06F 39/022
See application file for complete search history.

(56) References Cited

U.S. PATENT DOCUMENTS

| | | | |
|---|---|---|---|
| 5,266,233 A | 11/1993 | Houghton et al. | |
| 8,980,014 B2 | 3/2015 | Classen et al. | |
| 9,334,602 B2 | 5/2016 | Hasse et al. | |
| 9,481,959 B2 | 11/2016 | Doyle et al. | |
| 9,687,139 B2 | 6/2017 | McKenna et al. | |
| 10,863,880 B2 | 12/2020 | Tang et al. | |
| 11,352,733 B2 | 6/2022 | Tang et al. | |
| 2003/0116177 A1 | 6/2003 | Appel et al. | |
| 2009/0095027 A1 | 4/2009 | Deppermann et al. | |
| 2010/0000022 A1 | 1/2010 | Hendrickson et al. | |
| 2010/0000024 A1 | 1/2010 | Hendrickson et al. | |
| 2010/0000264 A1 | 1/2010 | Luckman et al. | |
| 2010/0000573 A1 | 1/2010 | Hendrickson et al. | |
| 2010/0000581 A1 | 1/2010 | Doyle et al. | |
| 2010/0000586 A1 | 1/2010 | Hendrickson | |
| 2013/0245242 A1 | 9/2013 | Torres | |
| 2014/0283561 A1 | 9/2014 | Mckenna | |
| 2015/0376556 A1 | 12/2015 | Ohtani | |
| 2016/0102278 A1 | 4/2016 | Labeque et al. | |
| 2021/0068610 A1 | 3/2021 | Tang et al. | |
| 2022/0259792 A1 | 8/2022 | Tang et al. | |

FOREIGN PATENT DOCUMENTS

| | | | |
|---|---|---|---|
| CN | 101204315 A | 6/2008 | |
| CN | 101877992 A | 11/2010 | |
| CN | 102226308 A | 10/2011 | |
| DE | 3901686 A1 | 7/1990 | |
| DE | 102010028483 A1 | 11/2011 | |
| EP | 379950 A1 | 7/1990 | |
| GB | 2311767 A | 10/1997 | |
| WO | 8601017 A1 | 2/1986 | |
| WO | 2011029766 A1 | 3/2011 | |
| WO | 2014187119 A1 | 11/2014 | |

OTHER PUBLICATIONS

PCT Suppl. Search Report and Written Opinion for PCT/CN2017/094615 dated Oct. 14, 2019, 11 pages.
PCT Search Report and Written Opinion for PCT/CN2017/094615 dated Apr. 4, 2018, 7 pages.
All Office Actions; U.S. Appl. No. 16/030,892, filed Jul. 10, 2018.
All Office Actions; U.S. Appl. No. 16/952,890, filed Nov. 19, 2020.
All Office Actions; U.S. Appl. No. 17/735,412, filed May 3, 2022.

*Primary Examiner* — Jason Y Ko
(74) *Attorney, Agent, or Firm* — Gary J. Foose

(57) ABSTRACT

A method for reducing auto-dosing fluctuation of a washing machine equipped with an automatic dosing device, by using a liquid detergent with a relatively low high-shear viscosity. A cleaning system including a washing machine equipped with an auto-dosing device, in combination with a liquid detergent characterized by a relative low high-shear viscosity.

8 Claims, No Drawings

METHOD AND SYSTEM FOR REDUCING AUTO-DOSING FLUCTUATION OF AN AUTOMATIC CLEANING MACHINE

FIELD OF THE INVENTION

This invention relates to reduction of auto-dosing fluctuation of an automatic cleaning machine.

BACKGROUND OF THE INVENTION

Automatic cleaning machines, such as automatic dish washers (ADWs) or automatic laundry washers (also commonly referred to as "automatic washing machines"), have brought ample convenience to modern households. Such automatic cleaning machines are typically equipped with detergent dispensing trays, which can be manually filled by a user (typically before a cleaning cycle) with a sufficient dose of a cleaning detergent for use during the cleaning cycle. However, such manual filling must be carried out before each cleaning cycle, which can turn out to be a very tedious task, especially if there are multiple loads of articles to be cleaned. Further, the user may either overfill or underfill the detergent dispensing tray, resulting in incorrect dosing of the cleaning detergent that may negatively impact the efficacy of the cleaning cycle.

Correspondingly, automatic detergent dosing capability (hereinafter "automatic dosing" or "auto-dosing") has been provided in newer automatic cleaning machines, which employ one or more automatic dosing devices to automatically dispense a single dose of a cleaning detergent from a bulk cartridge that contains multiple doses of such cleaning detergent into the main cleaning chamber during each cleaning cycle.

However, significant deviations from the pre-determined detergent dosage have been observed when using automatic dosing devices. Such dosing deviations may in turn lead to significant fluctuations in cleaning performance. In order to reduce such dosing deviations, additional precision-improving devices can be provided or installed in the automatic cleaning machine. For example, a single dose chamber can be provided or installed (in addition to the bulk cartridge and the automatic dosing device), which is sized to receive and dispense precisely a single dose of cleaning detergent. The single dose chamber may contain one or more sensors and/or controllers, which will automatically shut off any fluid communication with the bulk cartridge and the automatic dosing device when the single dose chamber is full, and will also effectuate the automatic dosing device to continue dispensing the cleaning detergent from the bulk cartridge if the single dose chamber is not yet full. However, such additional precision-improving device(s) may add to the engineering complexity and cost of the automatic cleaning machines. Further, if the user has already purchased an automatic cleaning machine with auto-dosing capacity but without such precision-improving device(s), it may be too troublesome and too costly to retrofit the already-purchased automatic cleaning machine with such precision-improving devices, or to replace such machines with new ones just to improve the auto-dosing accuracy.

Therefore, it is desirable to provide a simpler and cheaper solution to address such auto-dosing issue in existing automatic cleaning machines.

SUMMARY OF THE INVENTION

The present invention proposes to reduce the auto-dosing fluctuation and enable more consistent dosing in existing automatic cleaning machines, by employing a liquid detergent that is characterized by a relatively low high-shear viscosity. Such a liquid detergent has been found effective in reducing dosing fluctuations of automatic dosing devices in existing automatic cleaning machines in absence of any additional precision-improving devices, especially when the automatic dosing device is operating at high dosing rate and high shear, thereby resulting in more consistent cleaning performance under the same washing conditions and given the same target detergent dosage.

One aspect of the present invention relates to a method of reducing auto-dosing fluctuation of an automatic cleaning machine, comprising the steps of:
a. providing a liquid detergent composition, which is characterized by:
  i. a total surfactant level of at least about 25 wt %, by total weight of the liquid detergent composition;
  ii. a high-shear viscosity ranging from about 10 mPa·s to about 500 mPa·s when measured at 20° C. at a relatively high shear rate of about 20 $s^{-1}$; and
  iii. optionally, a low-shear viscosity ranging from about 500 mPa·s to about 50,000 mPa·s when measured at 20° C. at a relatively low shear rate of about 0.5 $s^{-1}$,
b. using said liquid detergent composition in an automatic cleaning machine, which comprises:
  i. a cleaning chamber for receiving an article for cleaning; and
  ii. a liquid detergent dispenser fluidly coupled to the cleaning chamber, while such liquid detergent dispenser comprises a bulk cartridge for storing multiple doses of the liquid detergent composition and an automatic dosing device for automatically dispensing a single dose of such liquid detergent composition from the bulk cartridge into the cleaning chamber during a cleaning cycle, while such automatic dosing device, when operating, is characterized by an operating flow rate ranging from about 0.1 ml/second to about 10 ml/second and an operating shear rate ranging from about 10 $s^{-1}$ to about 250 $s^{-1}$.

Another aspect of the present invention relates to a cleaning system comprising:
a. an automatic cleaning machine comprising:
  i. a cleaning chamber for receiving an article for cleaning; and
  ii. a liquid detergent dispenser fluidly coupled to the cleaning chamber, while such liquid detergent dispenser comprises a bulk cartridge for storing multiple doses of a liquid detergent composition and an automatic dosing device for automatically dispensing a single dose of the liquid detergent composition from the bulk cartridge into the cleaning chamber during a cleaning cycle, while the automatic dosing device, when operating, is characterized by an operating flow rate ranging from about 0.5 ml/second to about 10 ml/second and an operating shear rate ranging from about 10 $s^{-1}$ to about 250 $s^{-1}$;
b. the liquid detergent composition for use in said automatic cleaning machine, while the liquid detergent composition is characterized by:
  i. a total surfactant level of at least about 25 wt %, by total weight of such liquid detergent composition;
  ii. a high-shear viscosity ranging from about 10 mPa·s to about 500 mPa·s, when measured at 20° C. at a relatively high shear rate of about 20 $s^{-1}$; and
  iii. optionally, a low-shear viscosity ranging from about 500 mPa·s to about 50,000 mPa·s, when measured at 20° C. at a relatively low shear rate of about 0.5 $s^{-1}$.

Yet another aspect of the present invention relates to use of a liquid detergent for reducing auto-dosing fluctuation of an automatic cleaning machine with auto-dosing functionality, while such liquid detergent is characterized by:
  i. a total surfactant level of at least about 25 wt %, by total weight of said liquid detergent composition;
  ii. a high-shear viscosity ranging from about 10 mPa·s to about 500 mPa·s, when measured at 20° C. at a relatively high shear rate of about 20 s$^{-1}$; and
  iii. optionally, a low-shear viscosity ranging from about 500 mPa·s to about 50,000 mPa·s, when measured at 20° C. at a relatively low shear rate of about 0.5 s$^{-1}$.

These and other aspects of the present invention will become more apparent upon reading the following detailed description of the invention.

DETAILED DESCRIPTION OF THE INVENTION

Inventors of the present invention have discovered that by selectively using a liquid detergent composition having a relatively low high-shear viscosity (i.e., from about 10 mPa·s to about 500 mPa·s when measured at 20° C. at a relatively high shear rate of about 20 s$^{-1}$), the dosing accuracy of those automatic cleaning machines with auto-dosing capacity can be improved, and the dosing fluctuations between different cleaning cycles can be reduced, without the need for installing additional precision-improving devices or replacing the existing machines. It is important that such liquid detergent composition still has a relatively high total surfactant level (i.e., of at least about 25 wt % by total weight of such liquid detergent), so as to ensure satisfactory cleaning performance.

Further, it is preferred that such liquid detergent composition is a structured liquid with shear-thinning properties, i.e., it has a relatively high low-shear viscosity (i.e., from about 500 mPa·s to about 50,000 mPa·s when measured at 20° C. at a relatively low shear rate of about 0.5 s$^{-1}$). In this manner, when poured at a relatively lower shear rate (e.g., about 0.1-1 s$^{-1}$) at ambient pressure out of its container or package, the liquid detergent composition of the present invention is thick and viscous, which may be perceived by some consumers as containing more cleaning surfactants, being more concentrated, or of better quality. However, when dispensed by the automatic dosing device of the automatic cleaning machine from the bulk cartridge into the cleaning chamber at a high operating flow rate (e.g., about 0.1-10 ml/second) and a high operating shear rate (e.g., about 10-250 s$^{-1}$), the liquid detergent composition of the present invention is thin and runny, which helps to reduce auto-dosing fluctuation and improve the auto-dosing accuracy of the automatic cleaning machine.

As used herein, articles such as "a" and "an" when used in a claim, are understood to mean one or more of what is claimed or described. The terms "comprise," "comprises," "comprising," "contain," "contains," "containing," "include," "includes" and "including" are all meant to be non-limiting.

As used herein, the terms "substantially free of" or "substantially free from" mean that the indicated material is at the very minimum not deliberately added to the composition to form part of it, or, preferably, is not present at analytically detectable levels. It is meant to include compositions whereby the indicated material is present only as an impurity in one of the other materials deliberately included.

As used herein, the term "automatic cleaning machine" refers to a water-conducting household appliance, which may include an automatic laundry washing machine, an automatic washer-dryer, or an automatic dish washer.

As used herein, the term "bulk cartridge" refers to a container of any suitable size or shape, which is permanently built in or at least securely fixated to the automatic cleaning machine and is configured to store multiple doses of a liquid detergent composition. It is in contrast with a single dose chamber that is configured to store a single dose of a liquid detergent composition.

As used herein, the term "liquid" refers to a fluid having a liquid having a viscosity of from about 1 to about 2000 mPa*s at 25° C. and a shear rate of 20 sec$^{-1}$. In some embodiments, the viscosity of the liquid may be in the range of from about 200 to about 1000 mPa*s at 25° C. at a shear rate of 20 sec$^{-1}$. In some embodiments, the viscosity of the liquid may be in the range of from about 200 to about 500 mPa·s at 25° C. at a shear rate of 20 sec$^{-1}$. The viscosity can be determined using a Brookfield viscometer, No. 2 spindle, at 60 RPM/s.

As used herein, the term "liquid detergent" refers to any compositions or formulations of a liquid form that are designed for cleaning soiled material. Such compositions may include, but are not limited to, laundry cleaning compositions, fabric softening compositions, fabric enhancing compositions, fabric freshening compositions, laundry pre-washing compositions, laundry pretreating compositions, laundry additives (e.g., rinse additives, wash additives, etc.), post-rinse fabric treatment compositions, dry cleaning compositions, ironing aid, dish washing compositions, hard surface cleaning compositions, and other suitable compositions that may be apparent to one skilled in the art in view of the teachings herein.

As used herein, the term "automatic dosing device" may be a flow meter, a pump, a valve, a pipe, or any other device that is suitable for automatic dosing of a liquid detergent composition. As used herein, the term "high-shear viscosity" refers to the viscosity of the liquid detergent composition of the present invention when measured at atmospheric temperature (i.e., 20° C.) and a relatively high shear rate of about 20 s$^{-1}$. Specifically, the viscosity can be measured by a Brookfield DV-II+Pro Viscometer. In this measurement, the liquid detergent sample is controlled at 20° C. via a water bath (Model MPG-20C). A SC4-31 spindle is selected and set at a rotation speed of about 12 rotation per minute (RPM), which is appropriate for viscosity measurement between 15 mPa·s and 300,000 mPa·s at the shear rate of 20 s$^{-1}$.

As used herein, the term "low-shear viscosity" refers to the viscosity of the liquid detergent composition of the present invention when measured at atmospheric temperature (i.e., 20° C.) and a relatively low shear rate of about 0.5 s$^{-1}$. Specifically, the viscosity can be measured by a Brookfield DV-II+Pro Viscometer. In this measurement, the liquid detergent sample is controlled at 20° C. via a water bath (Model MPG-20C). A LV-2 (#62) spindle is selected and set at a rotation speed of about 2.5 RPM, which is appropriate for viscosity measurement between 50 mPa·s and 100,000 mPa·s at the shear rate of 0.5 s$^{-1}$.

The term "operating flow rate" refers to the volumetric flow rate of the liquid detergent composition through the automatic dosing device when such device is operating, i.e., actively dispensing the liquid detergent composition. Such operating flow rate is calculated as D/T, wherein D is the single dose of liquid detergent composition dispensed by the automatic dosing device, and wherein T is the dosing time. For example, when the automatic dosing device automatically dispenses a single dose of 50 ml of the liquid detergent composition within a dosing time of 20 seconds, the operating flow rate is about 2.5 ml/second.

The term "operating shear rate" refers to the shear rate at the inner wall of the liquid detergent composition (which is assumed to be a Newtonian fluid) within the pipe of the automatic dosing device when such device is operating, i.e., actively dispensing the liquid detergent composition. Such operating shear rate is calculated as $$\gamma = \frac{8v}{d},$$

wherein $\gamma$ is the shear rate, measured in reciprocal seconds, $v$ is the linear fluid velocity, and d is the inside diameter of the pipe. The linear fluid velocity $v$ is further calculated as $$\frac{D}{T \times \pi \times \left(\frac{d}{2}\right)^2},$$

so the operating shear rate is correspondingly calculated as $$\gamma = \frac{32 \times D}{T \times \pi \times (d)^3}.$$

For example, when the automatic dosing device has a pipe diameter of 5 mm and automatically dispenses a single dose of 25 ml of the liquid detergent composition within a dosing time of 20 seconds, the operating shear rate is about 102 s$^{-1}$. If an automatic dosing device contains multiple pipes of different inner diameters, then the smallest inner diameter is used to calculate the operating shear rate for purpose of the present invention.

As used herein, the term "soiled material" is used non-specifically and may refer to any type of flexible material consisting of a network of natural or artificial fibers, including natural, artificial, and synthetic fibers, such as, but not limited to, cotton, linen, wool, polyester, nylon, silk, acrylic, and the like, as well as various blends and combinations. Soiled material may further refer to any type of hard surface, including natural, artificial, or synthetic surfaces, such as, but not limited to, tile, granite, grout, glass, composite, vinyl, hardwood, metal, cooking surfaces, plastic, and the like, as well as blends and combinations.

As used herein, all concentrations and ratios are on a weight basis unless otherwise specified. All temperatures herein are in degrees Celsius (° C.) unless otherwise indicated. All conditions herein are at 20° C. and under the atmospheric pressure, unless otherwise specifically stated. All polymer molecular weights are determined by weight average number molecular weight unless otherwise specifically noted.

Liquid Detergent

To reduce auto-dosing fluctuation of the automatic cleaning machine, it is essential that the liquid detergent composition of the present invention has a relatively low high-shear viscosity, i.e., from about 10 mPa·s to about 500 mPa·s, preferably from about 20 to about 350 mPa·s, and more preferably from about 50 to about 300 mPa·s, when measured at conditions mentioned hereinabove for "high-shear viscosity" measurement. It has been discovered that the dosing fluctuations may be reduced by nearly half when liquid detergents of low high-shear viscosity are selected for use in automatic cleaning machine with auto-dosing capacity.

Although not necessary, it is preferred that the liquid detergent composition of the present invention exhibits good shear-thinning property, i.e., exhibiting a sufficiently high viscosity at a relatively low shear rate (e.g., about 0.5 s$^{-1}$) and a significantly reduced viscosity at a relatively high shear rate (e.g., about 20 s$^{-1}$). For example, the liquid detergent composition may be further characterized by a low-shear viscosity ranging from about 500 mPa·s to about 50,000 mPa·s, preferably from about 2,000 mPa·s to about 40,000 mPa·s, more preferably from about 3,000 mPa·s to about 30,000 mPa·s, and most preferably from about 5000 mPa·s to about 20,000 mPa·s, when measured conditions mentioned hereinabove for "low-shear viscosity" measurement.

More preferably, the liquid detergent composition of the present invention incorporates one or more external or internal structurants, i.e., thereby resulting in a structured liquid detergent with the above-mentioned shear-thinning property.

An "external structurant" as used herein refers to a material that has a primary function of providing rheological alteration, typically by increasing viscosity of a fluid, such as a liquid or gel or paste. External structurants do not, in and of themselves, provide any significant cleaning benefit. An external structurant is thus distinct from an "internal structurant" which, while also altering rheology of the liquid matrix, is incorporated into the liquid product for a different primary purpose. Exemplary external structurants include hydroxy-containing crystalline materials, polyacrylates, polysaccharides, polycarboxylates, amine oxides, alkali metal salts, alkaline earth metal salts, ammonium salts, alkanolammonium salts, $C_{12}$-$C_{20}$ fatty alcohols, di-benzylidene polyol acetal derivatives (DBPA), di-amido gallants, a cationic polymer comprising a first structural unit derived from methacrylamide and a second structural unit derived from diallyl dimethyl ammonium chloride, and combinations thereof. Preferably, the external structurant is a hydroxy-containing crystalline material generally characterized as crystalline, hydroxyl-containing fatty acids, fatty esters and fatty waxes, such as castor oil and castor oil derivatives. More preferably, the external structurant is a hydrogenated castor oil (HCO). The external structurant can be present at any suitable level in the liquid detergent composition. Preferably, the external structurant is present from about 0.05% to about 5%, preferably from about 0.08% to about 3%, more preferably from about 0.1% to about 1%, by total weight of the liquid detergent composition.

An "internal structurant" as used herein can be any active ingredient that is added to the liquid detergent composition primarily to act as a cleaning active, but it can at the same time alter rheological properties of such composition. For example, such internal structurant may be a self-structuring surfactant system containing a $C_8$-$C_{22}$ linear alkyl benzene sulfonate (LAS) surfactant or an acid form thereof in combination with a co-surfactant selected from the group consisting of a betaine-based zwitterionic surfactant, an amine oxide amphoteric surfactant, a branched alkyl alkoxylated alcohol nonionic surfactant, and mixture thereof, while the LAS is present in an amount ranging from about 5% to about 30%, preferably from about 6% to about 20%, by total weight of the liquid detergent composition, while the co-surfactant is present in an amount ranging from about 0.1% to about 30%, preferably from about 0.5% to about 20%, more preferably from about 1% to about 10%, by total weight of the liquid detergent composition.

The liquid detergent composition of the present invention may contain one or more surfactants selected from the group consisting of anionic surfactants, nonionic surfactants, cationic surfactants, zwitterionic surfactants, amphoteric surfactants, and combinations thereof, as long as the total surfactant level in such liquid detergent composition is at least about 25 wt % by total weight of said composition, in order to ensure satisfactory cleaning performance.

Specifically, the liquid detergent composition may contain from about 10 wt % to about 50 wt %, preferably from about 15 wt % to about 45 wt %, and more preferably from about 20 wt % to about 40 wt %, of an anionic surfactant. Useful anionic surfactants can themselves be of several different types. For example, water-soluble salts of the higher fatty acids, i.e., "soaps", are useful anionic surfactants in the compositions herein. This includes alkali metal soaps such as the sodium, potassium, ammonium, and alkyl ammonium salts of higher fatty acids containing from about 8 to about 24 carbon atoms, and preferably from about 12 to about 18 carbon atoms. Soaps can be made by direct saponification of fats and oils or by the neutralization of free fatty acids. Particularly useful are the sodium and potassium salts of the mixtures of fatty acids derived from coconut oil and tallow, i.e., sodium or potassium tallow and coconut soap. Additional non-soap anionic surfactants which are suitable for use herein include the water-soluble salts, preferably the alkali metal, and ammonium salts, of organic sulfuric reaction products having in their molecular structure an alkyl group (included in the term "alkyl" is the alkyl portion of acyl groups) containing from about 10 to about 20 carbon atoms and a sulfonic acid or sulfuric acid ester group. Examples of this group of synthetic anionic surfactants include, but are not limited to: a) the sodium, potassium and ammonium alkyl sulfates with either linear or branched carbon chains, especially those obtained by sulfating the higher alcohols ($C_{10}$-$C_{20}$ carbon atoms), such as those produced by reducing the glycerides of tallow or coconut oil; b) the sodium, potassium and ammonium alkylethoxy sulfates with either linear or branched carbon chains, particularly those in which the alkyl group contains from about 10 to about 20, preferably from about 12 to about 18 carbon atoms, and wherein the ethoxylated chain has, in average, a degree of ethoxylation ranging from about 0.1 to about 5, preferably from about 0.3 to about 4, and more preferably from about 0.5 to about 3; c) the sodium and potassium alkyl benzene sulfonates in which the alkyl group contains from about 10 to about 20 carbon atoms in either a linear or a branched carbon chain configuration, preferably a linear carbon chain configuration; d) the sodium, potassium and ammonium alkyl sulphonates in which the alkyl group contains from about 10 to about 20 carbon atoms in either a linear or a branched configuration; e) the sodium, potassium and ammonium alkyl phosphates or phosphonates in which the alkyl group contains from about 10 to about 20 carbon atoms in either a linear or a branched configuration, f) the sodium, potassium and ammonium alkyl carboxylates in which the alkyl group contains from about 10 to about 20 carbon atoms in either a linear or a branched configuration, and combinations thereof. Especially preferred for the practice of the present invention are surfactant systems containing $C_{10}$-$C_{20}$ linear alkyl benzene sulphonates (LAS), $C_{10}$-$C_{20}$ linear or branched alkylethoxy sulfates (AES) having an average degree of ethoxylation ranging from about 0.1 to about 5 (preferably from about 0.3 to about 4 and more preferably from about 0.5 to about 3.

Preferred for the practice of the present invention are liquid detergent compositions that contain one or more LAS surfactants and/or one or more AES surfactants, as described hereinabove. The LAS can be present in an amount ranging from about 0% to about 50%, preferably from about 1% to about 45%, more preferably from about 5% to about 40%, and most preferably from about 10% to about 35%, by total weight of said liquid detergent composition. The AES can also be present in an amount ranging from about 0% to about 50%, preferably from about 1% to about 45%, more preferably from about 5% to about 40%, and most preferably from about 10% to about 35%, by total weight of said liquid detergent composition. The weight ratio of AES to LAS, if both are present, may range from about 1:10 to about 10:1, preferably from about 1:8 to about 3:1, and more preferably from about 1:5 to about 2:1.

Further, the liquid detergent composition may contain from about 5 wt % to about 30 wt %, preferably from about 8 wt % to about 25 wt %, and more preferably from about 10 wt % to about 20 wt %, of a nonionic surfactant. Preferred nonionic surfactants are those of the formula $R^1(OC_2H_4)_nOH$, wherein $R^1$ is a $C_8$-$C_{18}$ alkyl group or alkyl phenyl group, and n is from about 1 to about 80. Particularly preferred are $C_8$-$C_{18}$ alkyl alkoxylated alcohols having an average degree of alkoxylation from 1 to 20.

Other surfactants useful herein include amphoteric surfactants and cationic surfactants. Such surfactants are well known for use in laundry detergents and are typically present at levels from about 0.2 wt % or 1 wt % to about 20 wt % or 30 wt % by total weight of the liquid detergent composition.

The liquid detergent composition of the present invention typically contains one or more carriers, such as water and organic solvents. Suitable organic solvents of the present invention may include diols (e.g., ethylene glycol, diethylene glycol, propylene glycol, dipropylene glycol, butylene glycol, pentanediol, and the like) and $C_4$-$C_{20}$ alcohols. The most preferably organic solvent for the practice of the present invention is propylene glycol. The organic solvent(s) may be present in the liquid detergent composition of the present invention at levels in the range of from about 1% to about 95%, preferably from about 5% to about 75%, by total weight of the liquid detergent composition. In a particularly preferred but not necessary embodiment of the present invention, the liquid detergent composition is anhydrous, i.e., it is substantially free of water. Highly preferred compositions afforded by the present invention are clear, isotropic liquids.

The liquid detergent composition of the present invention may further comprise, in addition to the ingredients described hereinabove, from about 0.1% to about 10%, preferably from about 0.5% to about 8%, and more preferably from about 1% to about 5% of one or more acids, such as citric acid, boric acid, and mixture thereof, by total weight of the liquid detergent composition. Preferably, the liquid detergent composition contains from about 1 wt % to about 3 wt % of citric acid and/or from about 1 wt % to about 3 wt % of boric acid. In addition, fatty acids, particularly $C_{12}$-$C_{18}$ fatty acids, or salts thereof can be included in the liquid detergent composition of the present invention. The total amount of such fatty acids or salts may range from about 0.1 wt % to about 5 wt %, preferably from about 0.5 wt % to about 4 wt %, and more preferably from about 0.7 wt % to about 3 wt %.

The liquid detergent compositions of the invention may also contain one or more adjunct ingredients commonly used for formulating liquid detergent compositions, such as builders, fillers, carriers, structurants or thickeners, clay soil removal/anti-redeposition agents, polymeric soil release agents, polymeric dispersing agents, polymeric grease cleaning agents, enzymes, enzyme stabilizing systems, amines, bleaching compounds, bleaching agents, bleach activators, bleach catalysts, brighteners, dyes, hueing agents, dye transfer inhibiting agents, chelating agents, softeners or conditioners (such as cationic polymers or silicones), perfumes (including perfume encapsulates), hygiene and malodor treatment agents, and the like.

Automatic Cleaning Machine with Auto-Dosing Capacity

The liquid detergent as described hereinabove is used in combination with one or more automatic cleaning machines with auto-dosing capacity to form a cleaning system with reduced auto-dosing fluctuation.

Such automatic cleaning machine may include any water-conducting household appliance, such as automatic laundry washing machines, automatic washer-dryers, or automatic dish washers.

Preferably, the automatic cleaning machine is configured for executing a cleaning cycle. The automatic cleaning machine may include a cleaning chamber for receiving an article for cleaning, and a liquid detergent dispenser that is fluidly coupled to the cleaning chamber. The liquid detergent as described hereinabove is stored in such liquid detergent dispenser, which is configured for dispensing the liquid detergent into the cleaning chamber as a part of the cleaning cycle, e.g., during a wash step. The liquid detergent dispenser may include a bulk cartridge for storing multiple doses of the above-mentioned liquid detergent composition, and an automatic dosing device for automatically dispensing a single dose of the liquid detergent composition from the bulk cartridge into the cleaning chamber during a cleaning cycle.

Automatic dosing devices for use in the present invention may include any device suitable for automatically dosing liquid detergents, including but not limited to, Venturi pumps (also referred to as aspirators), peristaltic pumps, gear pumps, siphon/suction pipes, gravity draining devices, etc. Particularly preferred are positive displacement pumps (such as peristaltic pumps) and ejector-jet pumps (such as aspirators).

Specifically, such automatic dosing device of the present invention is capable of high-throughput dosing, i.e., dosing a sufficient large volume of liquid detergent within a relatively short time. High-throughput automatic dosing device is particularly vulnerable to the dosing fluctuations as mentioned in the ensuing BACKGROUND section, so the combined use of the liquid detergent composition of the present invention with such high-throughput automatic dosing device is particularly beneficial. The high-throughput dosing can be quantified by an operating flow rate ranging from about 0.1 ml/second to about 10 ml/second, preferably from about 0.5 ml/second to about 2 ml/second, and more preferably from about 0.75 ml/second to about 1.5 ml/second. The high throughput dosing can also be quantified by an operating shear rate ranging from about 10 $s^{-1}$ to about 250 $s^{-1}$, preferably from about 15 $s^{-1}$ to about 200 $s^{-1}$, and more preferably from about 50 $s^{-1}$ to about 150 $s^{-1}$.

Preferably, the automatic cleaning machine of the present invention is devoid of any single dose chamber, and more preferably the automatic cleaning machine is devoid of any additional precision-improving devices besides the automatic dosing device.

The automatic cleaning machine of the present invention may further include a fabric enhancer dispenser, which is fluidly connected with the cleaning chamber. A liquid fabric enhancer can be stored in such fabric enhancer dispenser, which is configured for dispensing the liquid fabric enhancer into the cleaning chamber as a part of the cleaning cycle, e.g., during a rinse step.

The automatic cleaning machine may further contain a water supply fluidly, which is fluidly connected with the cleaning chamber, the liquid detergent dispenser, and/or the fabric enhancer dispenser for supplying water thereto to generate a wash liquid for cleaning articles in the cleaning chamber. The washing liquid may contain water, the liquid detergent, the fabric enhancer, and mixtures thereof. It may also contain one or more other fabric treatment additives.

Method of Using

The present invention uses the above-mentioned liquid detergent composition in the above-mentioned automatic cleaning machine with auto-dosing capacity, to reduce auto-dosing fluctuation thereof.

Such use can be carried out in any suitable manner. For example, the liquid detergent composition can be pre-stored in the bulk cartridge of the liquid detergent dispenser of the automatic cleaning machine when such machine is sold or offered for sale. For another example, the liquid detergent composition can be sold, offered for sale, or gifted together with sale of the automatic cleaning machine.

The liquid detergent composition can also be subsequently purchased and then added into automatic cleaning machine, more specifically into the bulk cartridge of the liquid detergent dispenser for dispensing by the automatic dosing device into the cleaning chamber. Preferably, the liquid detergent composition is sold, offered for sale, or gifted specifically for use in the automatic cleaning machine, e.g., in a package with one or more markers suggesting use thereof with the automatic cleaning machine, which can be selected from labels, user instructions, or any other means displaying the brand name/logo/trademark of the automatic cleaning machine. For yet another example, the automatic washing machine contains one or more markers suggesting use of the liquid detergent therewith, e.g., labels, user instructions, or any other means displaying the brand name/logo/trademark of the liquid detergent.

The present invention employs the above-mentioned liquid detergent composition in the above-mentioned automatic cleaning machine for treating and/or cleaning soiled material. Preferably, the soiled material to be treated and/or cleaned is contacted with the liquid laundry detergent as described hereinabove (as dissolved or dispensed in a wash liquor at an effective amount) in the automatic cleaning machine during at least a part of a cleaning cycle.

An "effective amount" of the liquid detergent means from about 1 g to about 300 g of the respective product dissolved or dispersed in a wash solution of volume from about 5 L to about 65 L. The water temperatures may range from about 5° C. to about 100° C. The water to soiled material (e.g., fabric) ratio may be from about 1:1 to about 30:1. The liquid detergent composition may be employed at concentrations of from about 300 ppm to about 40,000 ppm, preferably from about 350 ppm to about 10,000 ppm and more preferably from about 400 ppm to about 5000 ppm, in solution. In the context of a laundry detergent composition, usage levels may also vary depending not only on the type and severity of the soils and stains, but also on the wash water temperature, the volume of wash water, as well as the type of washing machine (e.g., top-loading, front-loading, top-loading, vertical-axis Japanese-type automatic cleaning machine).

The liquid detergent compositions herein may be used for treating and/or cleaning soiled material at reduced wash temperatures, e.g., from about 0° C. to about 20° C., or from about 0° C. to about 15° C., or from about 0° C. to about 9° C. The soiled material may be contacted to the water prior to, or after, or simultaneous with, contacting the liquid detergent composition with water.

EXAMPLE

Six liquid detergents of the following compositions and high-shear viscosities are provided:

TABLE I

| Ingredients (Wt %) | Sample 1 | Sample 2 | Sample 3 | Sample 4 | Sample 5 | Sample 6 |
|---|---|---|---|---|---|---|
| C10-C14 Linear alkyl benzene sulfonate (LAS) | 7.3 | 7.3 | 7.3 | 7.3 | 7.3 | 7.3 |
| C12-C14 Alkylethoxy sulfate (AES) | 4.3 | 4.3 | 4.3 | 4.3 | 4.3 | 4.3 |
| Borax | 1.5 | 1.5 | 1.5 | 1.5 | 1.5 | 1.5 |
| Citric acid | 1.6 | 1.6 | 1.6 | 1.6 | 1.6 | 1.6 |
| 1,2-Propanediol | 1.9 | 1.9 | 1.9 | 1.9 | 1.9 | 1.9 |
| Sodium formate | 0.34 | 0.34 | 0.34 | 0.34 | 0.34 | 0.34 |
| Ethanol | 5.0 | 4.26 | 3.48 | 2.7 | 2.3 | 2 |
| DTPA | 0.2 | 0.2 | 0.2 | 0.2 | 0.2 | 0.2 |
| Calcium formate | 0.065 | 0.065 | 0.065 | 0.065 | 0.065 | 0.065 |
| Linear C12-C14 ethoxylate (EO7) alcohol | 0.71 | 0.71 | 0.71 | 0.71 | 0.71 | 0.71 |
| C12-C14 Amino oxide | 0.71 | 0.71 | 0.71 | 0.71 | 0.71 | 0.71 |
| Fatty acid | 0.96 | 0.96 | 0.96 | 0.96 | 0.96 | 0.96 |
| Preservative | 0.0032 | 0.0032 | 0.0032 | 0.0032 | 0.0032 | 0.0032 |
| Silicone emulsion | 0.0094 | 0.0094 | 0.0094 | 0.0094 | 0.0094 | 0.0094 |
| Caustic 50% | Adjust to pH 7.8 | Adjust to pH 7.8 | Adjust to pH 7.8 | Adjust to pH 7.8 | Adjust to pH 7.8 | Adjust to pH 7.8 |
| Water | Balance | Balance | Balance | Balance | Balance | Balance |
| Total: | 100% | 100% | 100% | 100% | 100% | 100% |
| High-Shear Viscosity (mPa·s) | 210 | 307 | 495 | 802 | 1005 | 1205 |

A peristaltic pump GR1-6B with an internal pipe diameter of about 4 mm, which is commercially available from Baoding Ditron Tech Co. Ltd. (China), is used to automatically dose the above-mentioned liquid detergent samples at a pre-determined or target dosage of about 25 ml within a dosing time of about 20 seconds. Each liquid detergent sample is dosed 10 times, while the actual detergent dosage as dispensed by such peristaltic pump is recorded each time. The standard deviation (StDev) of the actual detergent dosages recorded from the 10 repetitions are then calculated for each sample, as follows:

TABLE II

| | Sample 1 (210 mPa·s) | Sample 2 (307 mPa·s) | Sample 3 (495 mPa·s) | Sample 4 (802 mPa·s) | Sample 5 (1005 mPa·s) | Sample 6* (1205 mPa·s) |
|---|---|---|---|---|---|---|
| Actual Dosage as Dispensed by Auto-Dosing | 25.54 | 25.58 | 25.69 | 26.14 | 25.70 | 25.27 |
| | 25.52 | 25.71 | 24.59 | 26.04 | 24.10 | 24.90 |
| | 25.71 | 25.06 | 25.57 | 26.03 | 25.26 | 24.71 |
| | 25.73 | 25.08 | 25.62 | 25.81 | 25.30 | 24.62 |
| | 25.24 | 25.26 | 24.49 | 25.68 | 25.38 | 24.51 |
| | 25.40 | 25.31 | 25.41 | 25.33 | 23.72 | 24.44 |
| | 25.38 | 25.48 | 25.48 | 24.67 | 25.18 | 24.35 |
| | 25.60 | 24.89 | 24.32 | 24.19 | 25.46 | 24.28 |
| | 25.62 | 24.94 | 25.28 | 23.89 | 23.82 | 24.18 |
| | 25.15 | 25.12 | 25.26 | 24.72 | 24.62 | 24.10 |
| StDev | 0.19 | 0.28 | 0.51 | 0.82 | 0.73 | 0.36 |

*The dosing time for this sample is 25 seconds, instead of 20 seconds, because it is too viscous to meet the 25 ml dosage target with 20 seconds of dosing time, even under the highest setting of the peristaltic pump.

The above table shows that the standard deviation of the actual dosage of the liquid detergents as auto-dosed by the peristaltic pump is significantly reduced, and in some cases more than halved, when the high-shear viscosity of the liquid detergent sample is no more than about 500 mPa·s, especially when it is no more than about 350 mPa·s or no more than about 300 mPa·s (i.e., 307 mPa·s).

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to

What is claimed is:

1. A cleaning system comprising:
   a. an automatic cleaning machine comprising:
      i. a cleaning chamber for receiving an article for cleaning; and
      ii. a liquid detergent dispenser fluidly coupled to the cleaning chamber, wherein said liquid detergent dispenser comprises a bulk cartridge for storing multiple doses of a liquid detergent composition and an automatic dosing device for automatically dispensing a single dose of said liquid detergent composition from said bulk cartridge into the cleaning chamber during a cleaning cycle, wherein said automatic dosing device, when operating, is characterized by an operating flow rate ranging from about 0.1 ml/second to about 10 ml/second and an operating shear rate ranging from about 10 $s^{-1}$ to about 250 $s^{-1}$;
   b. the liquid detergent composition for use in said automatic cleaning machine, wherein said liquid detergent composition is characterized by:
      i. a total surfactant level of at least about 25 wt %, by total weight of said liquid detergent composition; and
      ii. a high-shear viscosity ranging from about 10 mPa·s to about 500 mPa·s, when measured at 20° C. at a relatively high shear rate of 20 $s^{-1}$.

2. The cleaning system of claim 1, wherein the operating flow rate of said automatic dosing device ranges from about 0.5 ml/second to about 2 ml/second; wherein the operating shear rate of said auto-dosing pump ranges from about 15 $s^{-1}$ to about 200 $s^{-1}$; wherein the high-shear viscosity of said liquid detergent composition ranges from about 20 to about 350 mPa·s, when measured at 20° C. at a relatively high shear rate of 20 $s^{-1}$; and wherein the low-shear viscosity of said liquid detergent composition ranges from about 2,000 mPa·s to about 40,000 mPa·s, when measured at 20° C. and 0.5 $s^{-1}$.

3. The cleaning system of claim 1, wherein said auto-dosing pump is selected from the group consisting of peristaltic pumps, aspirator pumps, gear pumps, siphon or suction pipes, gravity draining devices, and combinations thereof.

4. The cleaning system according of claim 1, wherein the liquid detergent is stored in the bulk cartridge of said liquid detergent dispenser of the automatic cleaning machine.

5. The cleaning system according claim 1, wherein the liquid detergent is stored in a package with one or more markers suggesting use thereof with the automatic cleaning machine.

6. The cleaning system according to claim 1, wherein the automatic cleaning machine contains one or more markers suggesting use of the liquid detergent therewith.

7. The cleaning system according to claim 1, wherein said liquid detergent composition is characterized by a low-shear viscosity ranging from about 500 mPa·s to about 50,000 mPa·s, when measured at 20° C. at a relatively low shear rate of 0.5 $s^{-1}$.

8. The cleaning system according to claim 1, wherein said liquid detergent composition is free of linear or branched alkylethoxy sulfates.

* * * * *